UNITED STATES PATENT OFFICE.

GEORGE S. GORDON, OF NEW YORK, N. Y., ASSIGNOR TO GEORGE S. GORDON, MITCHEL WOLF, AND HARRY COWEN, AS COPARTNERS UNDER THE FIRM-NAME OF GORDON WOLF COWEN CO.

FOOD PRODUCT.

1,202,508.  Specification of Letters Patent.  Patented Oct. 24, 1916.

No Drawing.  Application filed July 21, 1916.  Serial No. 110,483.

*To all whom it may concern:*

Be it known that I, GEORGE S. GORDON, a citizen of the United States of America, residing at New York city, county and State of New York, have invented certain new and useful Improvements in Food Products, of which the following is a full, clear, and exact description.

My invention has for its object to improve the food-product or sweetmeat known as halvah so as to not only enhance its nutritive qualities and flavor, but also to eliminate an objectionable ingredient which it was heretofore found necessary to employ as a bleach and binder in the manufacture of halvah compounds, towit, soaproots or soapbarks. Saponin is often present to a greater or lesser degree in the soaproots and soapbarks heretofore utilized in manufacturing halvah, and certain species of saponin are considered sufficiently poisonous to be barred, under the pure food laws of various States, from use in foodstuffs. The employment of soaproots or barks in the manufacture of halvah, was for the purpose mainly to act as a bleaching and binding element, and when so used, the presence of saponin in the finished product could not be entirely avoided.

By my present invention, I provide a healthful and efficient bleaching and binding element for use in this character of food-product, which dispenses entirely with the use of the soaproots or barks heretofore employed in its manufacture, and I will now give a detailed description of my process and product, pointing out the novel features thereof in the appended claims.

To produce my improved product, I take (for instance) approximately 30 per cent. of glucose, and 20 per cent. of sugar, and boil the same together until reduced to a soft putty-like mass. After cooling the same, I add thereto .6 per cent. of pure white albumin (preferably egg albumen) and .4 per cent. of gelatin. Instead of egg albumen, I may use other animal or vegetable albumins which have a clarifying and bleaching effect. I find that by the use of albumin in my product, the same acts as a bleach for the same and the gelatin acts as a binder therefor. After the aforesaid bleach and binder elements have been stirred into the glucose and sugar, the mass is again boiled and while hot an oleaginous base composed of edible oil (cotton seed or maize oil), peanut butter and sesame seed is added in about the following proportions:

Peanut butter _____ 20%
Sesame seed _____ 20%
An edible oil or oils (as cottonseed or maize oil) _____ 9%

In other words, to make up one hundred parts of my product, the following ingredients in about the proportions stated will be employed:

30% glucose
20% sugar
20% peanut butter
20% shelled ground sesame seed
9% edible oil (cottonseed or maize oil)
.6% pure white albumin
.4% gelatin 100% Total.

It will, of course, be understood that I may in some cases use a large proportion of peanut butter and a lesser proportion of sesame seed, or I may in some cases omit the peanut butter entirely and increase the quantity of sesame seed; or again, I may increase or diminish or in fact, omit the edible oil and increase the quantity of sesame seed, which in itself provides an edible oil in the product.

Having now described my invention, what I claim and desire to secure by Letters Patent is:

1. A food product constituting a sweetmeat and containing an edible oil, an oleaginous base and egg albumen.

2. A food product constituting a sweetmeat and containing an oleaginous base, egg albumen and binding material.

3. A food-product containing an edible oil, an oleaginous base, egg albumen and a gelatin binder.

4. A food-compound containing approximately 50% glucose and sugar, an oleaginous base of about 49%, and an albuminous bleaching element and binder approximating about 1%.

5. A food-product constituting a sweetmeat and containing peanut butter, albumin and gelatin.

6. A food-compound, constituting a sweetmeat and containing peanut butter, an edible oil, sugar, glucose, and animal albumin.

7. The process of producing a food-product, consisting in boiling glucose and sugar together, allowing same to cool, then adding albumin and gelatin, then reboiling the mass, and finally adding to the boiling mass an oleaginous base.

8. The process of producing a food product consisting in boiling saccharine matter, allowing the same to cool, then adding albumin and reboiling the mixture and finally adding to the boiling mass an oleaginous base.

Signed at New York city, N. Y., this 20th day of July, 1916.

GEORGE S. GORDON.

Witnesses:
EDWARD A. JARVIS,
MAURICE BLOCK.